US007877383B2

(12) United States Patent
Cao et al.

(10) Patent No.: US 7,877,383 B2
(45) Date of Patent: Jan. 25, 2011

(54) RANKING AND ACCESSING DEFINITIONS OF TERMS

(75) Inventors: Yunbo Cao, Beijing (CN); Hang Li, Beijing (CN); Jun Xu, Tianjin (CN)

(73) Assignee: Microsoft Corporation, Redmond, WA (US)

( * ) Notice: Subject to any disclaimer, the term of this patent is extended or adjusted under 35 U.S.C. 154(b) by 1231 days.

(21) Appl. No.: 11/115,500

(22) Filed: Apr. 27, 2005

(65) Prior Publication Data

US 2006/0248049 A1    Nov. 2, 2006

(51) Int. Cl.
G06F 7/00    (2006.01)
(52) U.S. Cl. .................................. 707/723; 707/802
(58) Field of Classification Search .............. 707/104.1, 707/100, 10, 999.003, 999.004, 999.005
See application file for complete search history.

(56) References Cited

U.S. PATENT DOCUMENTS

| 4,429,372 | A | * | 1/1984 | Berry et al. ............... 715/236 |
| 5,333,313 | A | * | 7/1994 | Heising .................... 1/1 |
| 5,649,221 | A | * | 7/1997 | Crawford et al. ........... 715/234 |
| 5,745,776 | A | * | 4/1998 | Sheppard, II ............. 715/202 |
| 5,937,422 | A | * | 8/1999 | Nelson et al. ............. 715/206 |
| 6,185,550 | B1 | * | 2/2001 | Snow et al. ............... 1/1 |
| 6,212,532 | B1 | * | 4/2001 | Johnson et al. ............ 715/236 |
| 6,477,551 | B1 | * | 11/2002 | Johnson et al. ............ 715/202 |
| 6,678,681 | B1 | * | 1/2004 | Brin ........................ 707/754 |
| 6,750,864 | B1 | * | 6/2004 | Anwar ..................... 345/440 |
| 6,757,676 | B1 | * | 6/2004 | Sugaya et al. ............. 1/1 |
| 6,774,917 | B1 | * | 8/2004 | Foote et al. ............... 715/700 |
| 6,961,722 | B1 | * | 11/2005 | Bruecken .................. 707/3 |
| 7,124,364 | B2 | * | 10/2006 | Rust et al. ................ 715/260 |
| 7,136,876 | B1 | * | 11/2006 | Adar et al. ............... 707/104.1 |
| 7,194,395 | B2 | * | 3/2007 | Genovese ................. 703/6 |
| 2002/0059161 | A1 | * | 5/2002 | Li .......................... 707/1 |
| 2003/0037074 | A1 | * | 2/2003 | Dwork et al. ............. 707/500 |
| 2003/0177000 | A1 | * | 9/2003 | Mao et al. ................ 704/9 |
| 2004/0010505 | A1 | * | 1/2004 | Vishnubhotla ............. 707/100 |
| 2004/0019601 | A1 | * | 1/2004 | Gates ...................... 707/102 |
| 2004/0088351 | A1 | * | 5/2004 | Liu et al. ................. 709/203 |
| 2004/0249867 | A1 | * | 12/2004 | Kraiss et al. ............. 707/203 |
| 2005/0131886 | A1 | * | 6/2005 | Ejerhed et al. ............ 707/3 |
| 2005/0144158 | A1 | * | 6/2005 | Capper et al. ............. 707/3 |
| 2005/0160082 | A1 | * | 7/2005 | Dawson .................... 707/3 |
| 2005/0187923 | A1 | * | 8/2005 | Cipollone ................. 707/3 |
| 2005/0234976 | A1 | * | 10/2005 | Oara et al. ............... 707/103 R |
| 2006/0074885 | A1 | * | 4/2006 | Chiu et al. ............... 707/3 |
| 2006/0106837 | A1 | * | 5/2006 | Choi ....................... 707/101 |
| 2006/0195406 | A1 | * | 8/2006 | Burges et al. ............. 706/12 |
| 2008/0027769 | A1 | * | 1/2008 | Eder ....................... 705/7 |

OTHER PUBLICATIONS

E. Agichtein, S. Lawrence, and L. Gravano, "Learning search engine specific query transformations for question answering," In Proc. of the 10th World Wide Web Conference, 2001.

(Continued)

*Primary Examiner*—Eliyah S Harper
(74) *Attorney, Agent, or Firm*—Christopher J. Volkmann; Westman, Champlin & Kelly, P.A.

(57) ABSTRACT

A method of processing information is provided. The method includes collecting text strings of definition candidates from a data source. The definition candidates are ranked based on the text strings.

10 Claims, 2 Drawing Sheets

OTHER PUBLICATIONS

S. Blair-Goldensohn, K.R. McKeown, A.H. Schlaikjer, "Answering Definitional Questions: A Hybrid Approach," (Chapter 4), In New Directions in Question Answering, Mark Maybury, ed. AAAI Press.

S. Blair-Goldensohn, K.R. McKeown, A.H. Schlaikjer, "DefScriber: A Hybrid System for Definitional QA (Demo)." In Proc. of 26th annual International ACM SIGIR Conference, Toronto, Canada, Jul. 2003.

S. Blair-Goldensohn, K.R. McKeown, A.H. Schlaikjer, "A Hybrid Approach for QA Track Definitional Questions," In Proc. of 12th Annual Text Retrieval Conference, NIST, Nov. 2003.

Hang Cui, Min-Yen Kan and Tat-Seng Chua, "Unsupervised Learning of Soft Patterns for Generating Definitions from Outline News," Proc. of the 13th World Wide Web conference (WWW2004), New York, May 17-22, 2004.

A. Echihabi, U. Hermjakob, E. Hovy, D. Marcu, E. Melz, D. Ravichandran, "Multiple-Engine Question Answering in TextMap," In Proc. of 12th Annual Text Retrieval Conference, NIST, Nov. 2003.

S. Harabagiu, D. Moldovan, C. Clark, M. Bowden, J. Williams, J. Bensley, "Answer Mining by Combining Extraction Techniques with Abductive Reasoning," In Proc. of 12th Annual Text Retrieval Conference, NIST, Nov. 2003.

R. Herbrich, T. Graepel, K. Obermayer, "Support Vector Learning for Ordinal Regression," In Proc. of the 9th International Conference on Artificial Neural Networks, 1999.

T. Joachims, "Optimizing Search Engines Using Clickthrough Data," Proc. of the ACM Conference on Knowledge Discovery and Data Minding, ACM 2002.

Judith Klavans and Smaranda Muresan, "DEFINDER: Rule-Based Methods for the Extraction of Medical Terminology and their Associated Definitions from On-Line Text," In Proc. of AMIA Symposium 2000.

G. Lakoff, "Women, Fire, and Dangerous Things," What Categories Reveal about the Mind, Chicago University Press, Chicago, Ill., 1987.

V.I. Levenshtein, "Binary Codes Capable of Correcting Deletions, Insertions and Reversals," Doklady Akademii Nauk SSSR 163(4), p. 845-848, 1965.

Bing Liu, Chee Wee Chin, Hwee Tou Ng., "Mining Topic-Specific Concepts and Definitions on the Web," In Proc. of the 12th International World Wide Web conference, May 20-24, 2003, Budapest, Hungary.

S.E. Robertson, S. Walker, M.M. HancockBeaulieu, M. Gatford, and A. Payne, "Okapi at TREC-4.," In D.K. Harman, editor, The 4th Text Retrieval Conference, Gaithersburg, MD, 1996, NIST, Special Publication 500-236.

Margaret H. Sarner, Sandra Carberry, "A new Strategy for Providing Definitions in Task-Oriented Dialogues," Proc. of the 12th Conference on Computational Linguistics, Budapest, Hungry, 1998.

Q. Tan, X. Chai, W. Ng and D.L. Lee, "Applying Co-Training to Clickthrough Data for Search Engine Adaptation," In Proc. of the 9th International Conference on Database Systems for Advanced Applications, 2004.

Vladimir N., Vapnik, The Nature of Statistical Learning Theory, Springer, 1995.

E. Voorhees, 2003 Evaluating Answers to Definition Questions., In Proc., of HLT-NAACL, 2003, pp. 109-111.

E. Voorhees, Overview of the TREC 2003 Question Answering Track, In Proc. of 12th Annual Text Retrieval Conference, NIST Nov. 2003.

J. Xu, A. Licuanan, R. Weischedel, TREC 2003 QA at BBN: Answering Definitional Questions., In Proc. of 12th Annual Text Retrieval Conference, NIST, Nov. 2003.

Endong Xun, Changing Huang, Ming Zhou, A Unified Statistical model for the Identification of English BaseNP., Proc. of ACL 2000, Hong Kong, 2000.

H. Yang, H. Cui, M.-Y. Kan, M. Maslennikov, L. Qui, T.-S. Chua, Qualifier in TREC-13 QA Main Task. In Proc. of 12th Annual Text Retrieval Conference, NIST, Nov. 2003.

http://www.google.com/help/features.html#definitions. Oct. 7, 2005.

"Gist Support Vector Machine" Overview of the SVM algorithm; http://svm.sdsc.edu/svm-overview.html, Mar. 15, 2005.

"Support vector machine" Wikipedia encyclopedia, http://en.wikipedia.org/wiki/Support_vector_machine, Mar. 15, 2005.

"Perceptron", Wikipedia encyclopedia; http://en.wikipedia.org/wiki/Perceptron, Apr. 11, 2005.

"History of the Perceptron", http://www.csulb.edu/~cwallis/artificialn/History.htm, Apr. 11, 2005.

Hang Cui, Min-Yen Kan and Tat-Seng Chua, *Generic Soft Pattern Models for Definitional Question Answering*, In Proceedings of the 28th Annual International ACM SIGIR Conference on Research and Development of Information Retrieval (SIGIR 2005), Salvador, Brazil, Aug. 15-19, 2005.

Hang Cui, Min-Yen Kan, Tat-Seng Chua and Jing Xiao, *A Comparative Study on Sentence Retrieval for Definitional Question Answering*, SIGIR Workshop on Information Retrieval for Question Answering (IR4QA), Sheffield, U.K., 2004.

S. Blair-Goldensohn, K. McKeown, and A. Schlaikjer. A hybrid approach for answering definitional questions. Technical Report CUCS-006-03, Columbia University, 2003.

\* cited by examiner

RANKING AND ACCESSING DEFINITIONS OF TERMS

BACKGROUND OF THE INVENTION

The present invention relates to processing information. In particular, the present invention relates to accessing and ranking definitions of terms.

Definitions include a statement of the meanings of words, phrases and terms and thus are useful information. Searching and finding relevant definitions can be cumbersome and difficult. In some situations, a large number of descriptions related to a term can be accessed, for example using the Internet. In other situations, for example on a company intranet, few descriptions of terms may exist. In either case, it can be cumbersome to manually search through results to find a relevant, useful definition for a term.

A traditional information retrieval process is designed to search for entire relevant documents given an input query, and thus is not suitable for providing useful definitions. Other processes, given questions of "what is X" or "who is X", extract answers from multiple documents and combine the extracted answers into a single unified answer. This process of question/answering can be a means of helping people find definitions. However, the process is difficult to realize in practice. Usually definitions extracted from different documents describe terms from different perspectives, and thus are not suitable for combination.

Additionally, methods for extracting definitions from documents have also been proposed in text mining applications. These methods resort to human-defined rules for definition extraction. The rules can provide relevant definitions, but also can result in a large amount of information that a user will need to look through to find relevant information. As a result, there is a need to provide relevant definitions to a user in a more efficient, useful manner.

SUMMARY OF THE INVENTION

The present invention relates to ranking and accessing definition candidates. In one aspect of the present invention, a method of processing information includes collecting text strings of definition candidates from a data source. The definition candidates are ranked based on the text strings. In another method of processing information, training data having definition candidates is accessed. Each definition candidate has a label that classifies the definition candidate. A ranking model is developed to rank definition candidates based on the training data and the labels.

Another aspect of the present invention relates to a method of accessing definition candidates. The method includes receiving an input query having a term. The term is compared to a data source of definition candidates. A ranked list of definition candidates related to the term is presented. The ranked list is based on text strings of the definition candidates.

DETAILED DESCRIPTION OF ILLUSTRATIVE EMBODIMENTS

Figure 1:
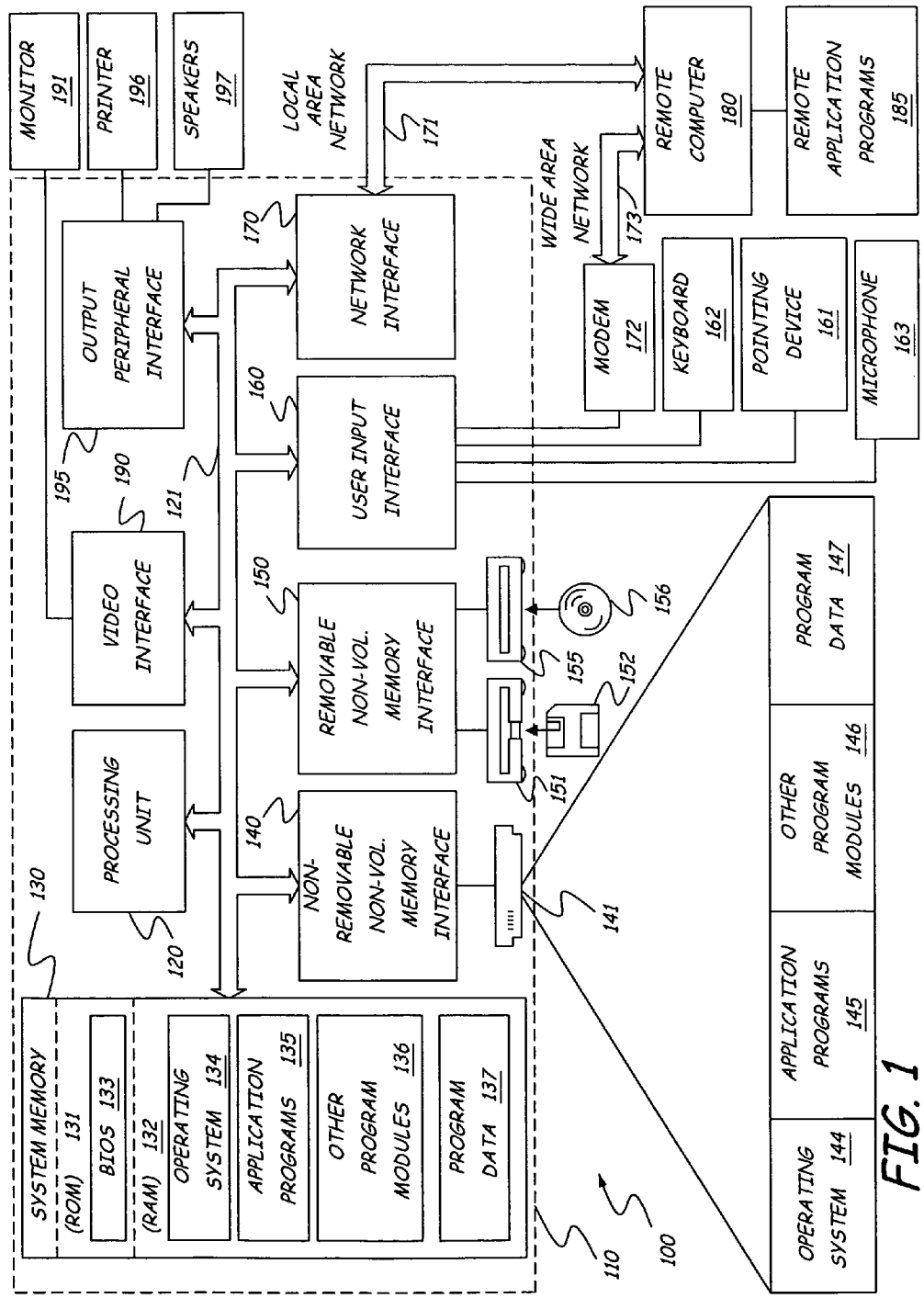
FIG. 1 is a block diagram of a general computing environment.

The present invention relates to processing data related to definitions in a computing environment. Before describing the invention in more detail, one exemplary environment in which the present invention can be used will be discussed. FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way oF example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

Figure 2:
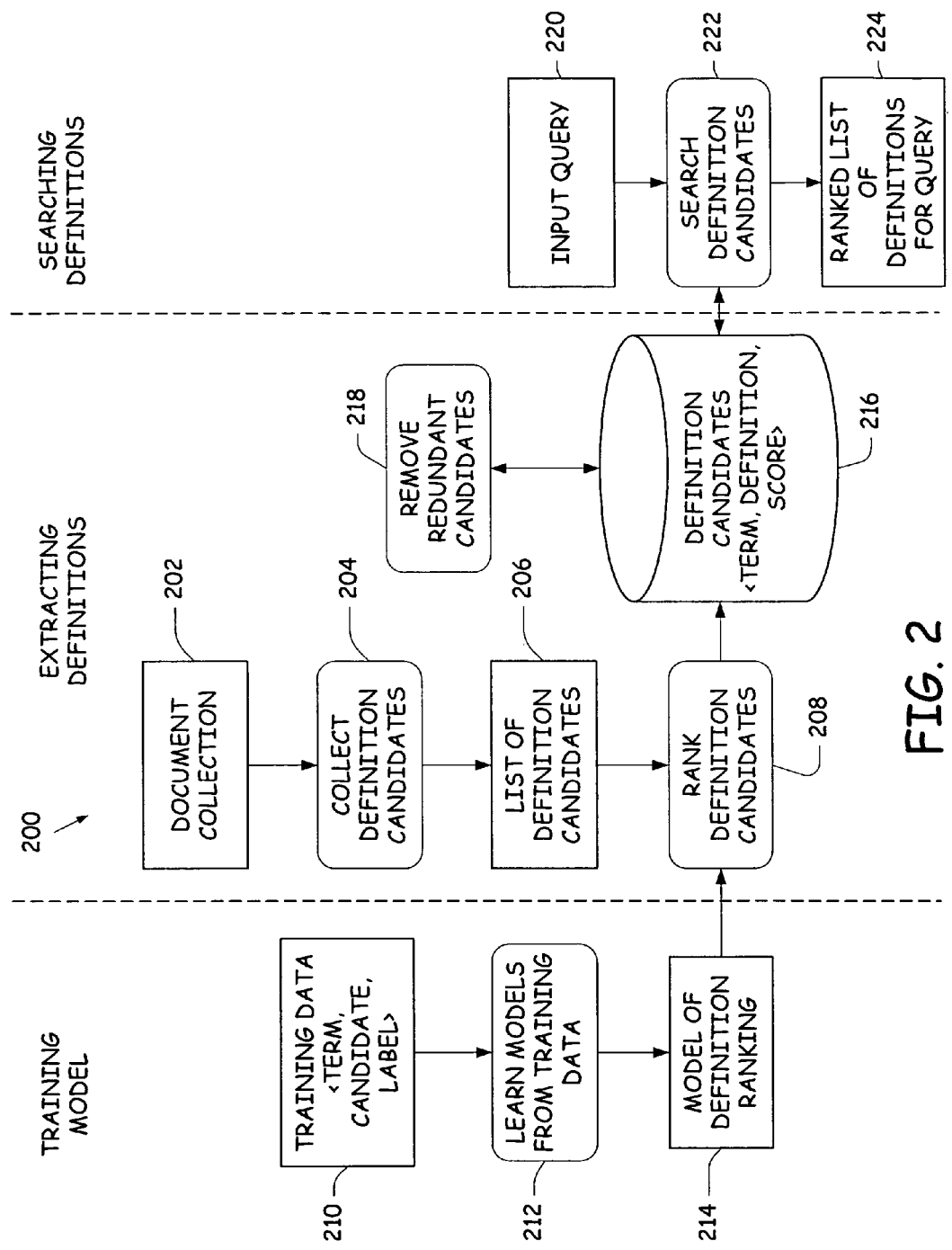
FIG. 2 is a flow diagram of components for accessing and ranking definition candidates.

FIG. 2 is an illustrative flow diagram 200 for ranking and accessing definitions. As discussed below, the present invention includes extracting definition candidates from a data source, training a ranking model and searching definition candidates. Extracting definitions includes collecting likely definition candidates from a data source such as a document collection. The candidates can be either paragraphs or sentences, for example. The definition candidates are ranked according to a ranking model that is trained to indicate the degree to which a definition candidate is a good definition. During searching, an input query is received. For example, the query can include a noun phrase representing a concept. The ranked definition candidates are searched based on the query.

There are many considerations related to handling definition information. These considerations are taken into account when developing and training a ranking model. First, a term can be defined from different perspectives and contents of extracted definitions from different documents can be diverse. It can be a difficult task (even for humans) to summarize definitions into a natural 'text'. This situation is particularly true when the extracted definition candidates are paragraphs. For example, Table 1 below lists different definitions of the term "HTML" from different perspectives.

TABLE 1

Definitions of 'HTML' from different perspectives

1. HTML is an application of ISO Standard 8879:1986 Information Processing Text and Office Systems; Standard Generalized Markup Language (SGML). The HTML Document Type Definition (DTD) is a formal definition of the HTML syntax in terms of SGML.
2. HTML is an acronym for Hyper Text Markup Language, which is the standard that defines how Web documents are formatted. HTML is a subset of SGML, which is the acronym for Standardized General Markup Language.
3. HTML is a text-based programming language that uses tags to tell the browser how to display information such as text and graphics.
4. HTML is the programming language used to write Web pages. It defines a formatting syntax, based on tags, for displaying pages of information, for example font, font size, back ground color, image placement and so on.

Furthermore, the qualities of definitions extracted from different documents can vary. Usually, there are many definitions which can not be viewed as 'good definitions'. However, they can still help people's understanding as 'explanations' of terms. These definitions can be useful when there are not enough good definitions for a term. As a result, ranking definition candidates can be used as a mechanism for users to access useful definitions.

Given these considerations, definitions can be ranked based on degrees of goodness. Ranking extracted definitions and using only the top n good definitions can result in more precise searching of definitions. Definition ranking can also be used as one step for text mining methods.

Table 2 below lists example sentences (excerpts) about the term 'Linux', which are extracted from real texts. Sentences 1-3 describe the general notion and the main properties of 'Linux'. These sentences can be viewed as good definitions. Sentences 4-7 explain properties of 'Linux' from different viewpoints and sentences 8-9 are opinions on 'Linux'. These sentences provide useful information, but are limited in providing an objective standard meaning for the term.

TABLE 2

Example definition candidates for 'Linux'

1. Linux is an open source operating system that was derived from UNIX in 1991.
2. Linux is a UNIX-based operating system that was developed in 1991 by Linus Torvalds, then a student in Finland.
3. Linux is a free Unix-type operating system originally created by Linus Torvalds with the assistance of developers around the world.
4. Linux is a command line based OS.
5. Linux is the best-known product distributed under the GPL.
6. Linux is the platform for the communication applications for the dealer network.
7. Linux is a Unicode platform.
8. Linux is an excellent product.
9. Linux is a phenomenon that is growing from the bottom up.

Judging whether a definition is good or not in an objective way can be difficult. However, relatively objective guidelines for judgment can be used in ranking definition candidates. The guidelines contribute to development and evaluation of definition ranking.

In one aspect of the present invention, three categories for definitions are used. The categories represent a level of "goodness" as definitions: 'good definition', 'indifferent definition' and 'bad definition'. "Goodness" is a measure of usefulness or relevancy of a definition candidate. Using this measure, an objective ranking method can be established to assist in searching for definitions. In another aspect, only good and bad definition labels are used.

A good definition must contain the general notion of a term (i.e., the term can be described with the expression 'is a kind of') and several important properties of the term. A good definition includes a statement conveying fundamental character of a term and/or a statement of the meaning of the term. From a good definition, one can understand the basic meaning of the term. Sentences 1-3 in Table 2 are examples of a good definition.

A bad definition neither describes the general notion nor the properties of the term. It can be an opinion, impression, or feeling of people about the term. One cannot obtain the meaning of the term by reading a bad definition. Sentences 8-9 in Table 2 are examples of a bad definition.

An indifferent definition is one that is between good and bad definitions. Sentences 4-7 in Table 2 are examples.

Flow diagram 200 in FIG. 2 illustrates stages including training a model, extracting definitions and searching definitions. In one embodiment, training the model and extracting definitions are performed off-line while searching definitions is performed on-line. In extracting definitions, <term, definition, score> triples are extracted from a collection of documents. The elements of the triple include, respectively, a term, a definition of the term, and a score, which represents a measure of goodness as a definition. In searching definitions, given a query term, the triples matched against the query term are retrieved and presented in descending order according to the associated scores. It is worth noting that both paragraphs and sentences can be considered as definition candidates.

Extraction of Definitions

Collecting Definition Candidates

A document collection 202 is accessed to collect definition candidates. The document collection 202 can be any type of data source having a plurality of documents, for example a company intranet or the Internet. Using collecting process 204, definition candidates are collected from collection 202. Any suitable collection process can be used. In one embodiment, sentences and/or paragraphs that match with heuristic rules are identified as definition candidates. The heuristic rules can help in filtering unlikely definition candidates.

When collecting candidates, all sentences in a paragraph are parsed with a Base NP (base noun phrase) parser and identified <term> using various rules. For example, the following rules can be used.

1. <term> is the first Base NP of the first sentence.
2. Two Base NPs separated by 'of' or 'for' are considered as <term>. For example, 'Perl for ISAPI' is the term from the sentence "Perl for ISAPI is a plug-in designed to run Perl scripts . . . ."

Next, definition candidates are extracted with the following patterns,

1. <term> is a|an|the*
2. <term>, *, a|an|the*
3. <term> is one of*

Here, '*' denotes a word string containing one or more words and '|' denotes 'or'.

The uses of other sets of rules for definition candidate collection are also possible. After collection process 204, a list of definition candidates 206 is developed. This list 206 is ranked using ranking process 208.

Ranking Definition Candidates

Ranking definition candidates (process 208) determines the goodness of a candidate as a definition. The goodness of a definition candidate is determined by text strings of the paragraph and is independent of the term itself. Thus, ranking on the basis of goodness as definition differs from ranking on the basis of relevance to a query, which for example is used in traditional information retrieval.

In one embodiment of the present invention, a statistical machine learning approach is used to address ranking definition candidates. Definition candidates are labeled in advance and used in training a ranking model.

Given a training data set $D=\{x_i,y_i\}_1^n$, a ranking model is constructed that can minimize error in prediction of y given x (a generalization error). Here $x_i \in X$ and $y_i \in \{good, indifferent, bad\}$ represent a definition candidate and a label representing its goodness, respectively. When applied to a new instance x, the model predicts the corresponding y and outputs a score of the prediction.

Various machine learning algorithms can be used to learn models from training data (process 212). One algorithm includes ordinal regression in which the labels good, bad and indifferent are used. A ranking support vector machine (Ranking SVM) is used for ordinal regression. For classification, in which only the labels good and bad are used, a support vector machine (SVM) is used. A ranking SVM or SVM assigns a score to each definition candidate. The score represents the degree to which the definition candidate conveys a meaning of the term. The higher the score, the better the candidate is as a definition. Alternatively, other classification models and ranking models can be used, such as a perceptron or ranking perceptron algorithm. A perceptron algorithm involves weighted inputs to a node that provides a classification based on the output from the node.

Ranking Based on Ordinal Regression

Instances are placed into the categories: 'good', 'indifferent' and 'bad' in an ordinal regression ranking situation. There is an order between the three categories. The cost of misclassifying a good instance into 'bad' should be larger than that of misclassifying the instance into 'indifferent'.

Given an instance x (definition candidate), Ranking SVM assigns a score to the instance based on the equation:

$$U(x)=w^T x, \quad (1)$$

where w represents a vector of weights. The higher the value of U(x) is, the better the instance x is as a definition. In ordinal regression, the values of U(x) are mapped into intervals on a line graph where intervals correspond to the ordered categories. An instance that falls into one interval is classified into the corresponding ordered category.

The construction of a Ranking SVM uses labeled training data 210 (in this case, the ordered categories are good, indifferent, and bad definitions). A learning algorithm, process 212, creates a utility function similar to equation (1), such that the utility function best reflects 'preference orders' between instance pairs in the training data 210. The learning process 212 creates a model of definition ranking 214 that is used in ranking process 208.

Ranking Based on Classification

In this algorithm, only good and bad definitions are used. Therefore, the ranking can be addressed as that of binary classification.

SVM (Support Vector Machines) are used as the model of classification. Given an instance x (definition candidate), SVM assigns a score to the candidate based on:

$$f(x)=w^T x+b, \quad (2)$$

where w denotes a vector of weights and b denotes an intercept. The higher the value of f(x) is, the better the instance x is as a definition. In classification, a sign of f(x) is used. If the sign is positive, then x is classified into the positive category, otherwise x is classified into the negative category.

The SVM uses labeled training data 210 (in this case, the categories are good and bad definitions). The learning algorithm creates a 'hyper plane' similar to that in equation (2), such that the hyper plane separates the positive and negative instances in the training data with the largest 'margin'.

It is worth noting that both Ranking SVM and SVM can be extended to non-linear models based on kernel functions. The model 214 is used during the ranking process 208.

Features Utilized by Learning Model

Ranking SVM and SVM can utilize the same set of features to develop a set of weights for respective ranking models. Table 3 below shows an exemplary list of the features. There are positive features like (1) and (7). Thus, if the term appears at the beginning of the paragraph or repeatedly occurs in the paragraph, then it is likely the paragraph is a definition of the term. There are also negative features like (4) and (11). If words like 'she', 'he', 'said' occur in the paragraph, or adjectives occur in the paragraph, then it is likely the paragraph is not a (good) definition.

Ranking SVM and SVM also utilize 'bag-of-words' features (12). High frequency words appearing immediately after terms in training data are collected as keywords. If a paragraph contains such a keyword, then the corresponding feature value will be 1, otherwise 0.

TABLE 3

Features used in ranking models

1. <term> occurs at the beginning of the paragraph.
2. <term> begins with 'the', 'a', or 'an'.
3. All the words in <term> begin with uppercase letters.
4. Paragraph contains predefined negative words, e.g. 'he', 'she', 'said'
5. <term> contains pronouns.
6. <term> contains 'of', 'for', 'and', 'or' or ','.
7. <term> re-occurs in the paragraph.
8. <term> is followed by 'is a ', 'is an' or 'is the '.
9. Number of sentences in the paragraph.
10. Number of words in the paragraph.
11. Number of the adjectives in the paragraph.
12. Bag of words: words frequently occurring within a window after <term>

Removing Redundant Candidates

After ranking, we obtain a ranked list of definition candidates for each term that can be stored in a database 216. There can be duplicate (or partially duplicate) definition candidates in database 216. These candidates can be removed using process 218 since the duplicates are redundant for users.

During process 218, it is determined whether two definition candidates are duplicates or partial duplicates using a similarity algorithm such as an edit distance algorithm. If two definition candidates are too similar, the candidate with the lower score is removed from database 216.

Searching Definitions

The data for definition search is stored in database 216. The data is in the form of <term, definition, score> triples. For each term, the corresponding definition candidates and scores are grouped together and the definition candidates are sorted in descending order of the scores.

During search, an input query 220 is received. The definition candidates are searched (process 222) using the input query 220. Search process 222 retrieves sorted definition candidates from database 216 with regard to the search term by table lookup. For example, given the query term 'Linux', we retrieve a ranked list of the definition candidates 224. An exemplary list is shown below in Table 4:

TABLE 4

Ranked list of definitions for 'Linux'

| Definition | Score |
|---|---|
| 1. Linux is an open source operating system that was derived from UNIX in 1991. | 1.9469 |
| 2. Linux is a free Unix-type operating system originally created by Linus Torvalds with the assistance of developers around the world. | 1.6816 |
| 3. Linux is a UNIX-based operating system that was developed in 1991 by Linus Torvalds, then a student in Finland. | 1.6289 |
| 4. Linux is the best-known product distributed under the GPL. | 1.0206 |
| 5. Linux is the platform for the communication applications for the dealer network. | 0.8764 |
| 6. Linux is a command line based OS. | 0.7485 |
| 7. Linux is a Unicode platform. | 0.6553 |
| 8. Linux is a phenomenon that is growing from the bottom up. | 0.3219 |
| 9. Linux is an excellent product. | 0.1710 |

By using the invention described above, an efficient process for searching definitions is realized. A ranking process assigns a score to the definitions and presented to a user. The ranked definitions can easily be accessed for finding relevant definitions.

Although the present invention has been described with reference to particular embodiments, workers skilled in the art will recognize that changes may be made in form and detail without departing from the spirit and scope of the invention.

What is claimed is:

1. A computer-implemented method of processing information, comprising:
    developing a ranking model using training data including a plurality of training definition candidates for a plurality of terms, each training definition candidate having a label that classifies the training definition candidate, wherein the labels include at least two of good, bad and indifferent labels;
    collecting text strings of definition candidates from a data source;
    identifying features in the text strings of definition candidates;
    ranking, using a processor of the computer, the definition candidates for a selected term based on the text strings, wherein ranking the definition candidates for the selected term comprises utilizing the ranking model to generate a definition tuple for each of the associated definition candidates for the selected term, the definition tuple for each of the associated definition candidates comprising:
        the selected term, the associated definition candidate, and a score assigned to the associated definition candidate by the ranking model, wherein the score is calculated based on the identified features for the associated definition candidate independent of the selected term, and wherein the score is indicative of a measure of a degree to which the associated definition candidate conveys a meaning of the selected term;
    storing the definition tuple for each of the definition candidates for the selected term in a database;
    comparing similar definition candidates for the selected term and removing the definition tuples for the similar definition candidates from the database, based on the scores assigned to the similar definition candidates, if the similar definition candidates are substantially duplicates, wherein comparing similar definition candidates comprises comparing a first definition candidate for the selected term and a second definition candidate for the selected term, and wherein removing comprises removing one of the first and second definition candidate from the database having a lower assigned score;
    receiving an input query having the selected term; and
    accessing the definition tuples for the selected term to present a ranked list of definition candidates for the selected term, wherein the ranked list includes the associated definition candidates obtained from the definition tuples and is ranked in an order based on the scores obtained from the definition tuples, wherein the definition candidates in the ranked list are ranked based on the scores associated with each definition tuple and are ranked independent of the select term and the input query.

2. The method of claim 1 and further comprising identifying terms in the data source having an associated definition candidate.

3. The method of claim 1 and further comprising parsing sentences in the data source.

4. The method of claim 1 wherein collecting definition candidates includes matching patterns in the data source.

5. A computer-implemented method of accessing definition candidates, comprising:
    accessing a data source comprising a collection of documents;
    identifying terms in the data source having associated definition candidates;
    for a term identified in the data source,
        collecting text strings of the associated definition candidates for the term from the data source;
        identifying features in the collected text strings of the associated definition candidates for the term;
        ranking the associated definition candidates for the term based on the text strings, wherein ranking comprises utilizing a ranking model to generate a definition tuple for each of the associated definition candidates for the term, the definition tuple for each of the associated definition candidates comprising:
            the term, the associated definition candidate, and a score assigned to the associated definition candidate by the ranking model, wherein the score is calculated based on the identified features for the associated definition candidate independent of the term, and wherein the score is indicative of a measure of a degree to which the associated definition candidate conveys a meaning of the term; and
        storing the definition tuple for each of the definition candidates for the term in a database;
    receiving an input query having the term; and
    accessing the definition tuples for the term to present a ranked list of definition candidates for the term using a processor of the computer, wherein the ranked list includes the associated definition candidates obtained from the definition tuples and is ranked in an order based on the scores obtained from the definition tuples, wherein the definition candidates in the ranked list are ranked based on the scores associated with each definition tuple and are ranked independent of the term and the input query.

6. The method of claim 5, wherein the score associated with each definition tuple is indicative of a level of goodness of the associated definition candidate associated with the definition tuple.

7. The method of claim 6 wherein the score for a definition candidate is low if text strings are an opinion of the term.

8. The method of claim 6 wherein the score for a definition candidate is high if the text strings are a relevant definition of the term.

9. The method of claim 1, wherein the scores assigned to the definition candidates are indicative of a level of goodness of the definition candidates.

10. The method of claim 5, and further comprising:

removing similar definition candidates for the term from the database, based on the scores assigned to the similar definition candidates in the definition tuples, if the similar definition candidates are substantially duplicates by comparing a first definition candidate for the term and a second definition candidate for the term and removing one of the first and second definition candidates from the database having a lower assigned score.

* * * * *